(12) United States Patent
Lussier

(10) Patent No.: US 6,402,268 B1
(45) Date of Patent: Jun. 11, 2002

(54) ENDLESS BELT FOR USE WITH HEAVY DUTY TRACK VEHICLES

(75) Inventor: Alain Lussier, Saint-François-Xavier-de-Brompton (CA)

(73) Assignee: Camoplast Inc., Sherbrooke (CA)

(*) Notice: Subject to any disclaimer, the term of this patent is extended or adjusted under 35 U.S.C. 154(b) by 0 days.

(21) Appl. No.: 09/879,717

(22) Filed: Jun. 11, 2001

(51) Int. Cl.$^7$ ............................................. B62D 55/205
(52) U.S. Cl. ...................... 305/165; 305/178; 305/160; 474/260; 474/901; 474/237
(58) Field of Search ................................ 305/158, 165, 305/157, 169, 185, 160, 174, 178, 179, 180, 193; 474/260, 263, 264, 265, 266, 237, 901

(56) References Cited

U.S. PATENT DOCUMENTS

| | | | | |
|---|---|---|---|---|
| 5,005,922 A | * | 4/1991 | Edwards et al. | 305/170 |
| 5,273,496 A | * | 12/1993 | White, Jr. | 474/205 |
| 5,279,378 A | | 1/1994 | Grawey et al. | 180/9.21 |
| 5,984,438 A | | 11/1999 | Tsunoda et al. | 305/169 |
| 6,068,354 A | * | 5/2000 | Akiyama et al. | 305/160 |
| 6,336,885 B1 | * | 1/2002 | Hayashi | 474/260 |

* cited by examiner

Primary Examiner—Russell D. Stormer
Assistant Examiner—Frantz F. Jules
(74) Attorney, Agent, or Firm—Darby & Darby

(57) ABSTRACT

An endless belt for use with a heavy duty track vehicle comprises a body made of polymeric material wherein a series of longitudinally spaced guide members are integrally formed to the inner surface thereof while two rows of longitudinally spaced tread members are integrally formed to the outer surface thereof. Each tread member in each row has an outer edge area adjacent the outer edge of the body and an inner edge area terminating substantially at mid-section of the body. Each tread member of the first row is longitudinally offset relative to an adjacent tread member of the second row. Each inner edge area of the tread members is in vertical alignment with a corresponding one of the guide members of the inner surface of the body. Also, the pitch defined by two successive guide members differs in value from other pitches along the outer surfaces of the belt. This particular geometry of tread members and drive members is such as to reduce slitting damages to the track when driven as well as vibration.

3 Claims, 3 Drawing Sheets

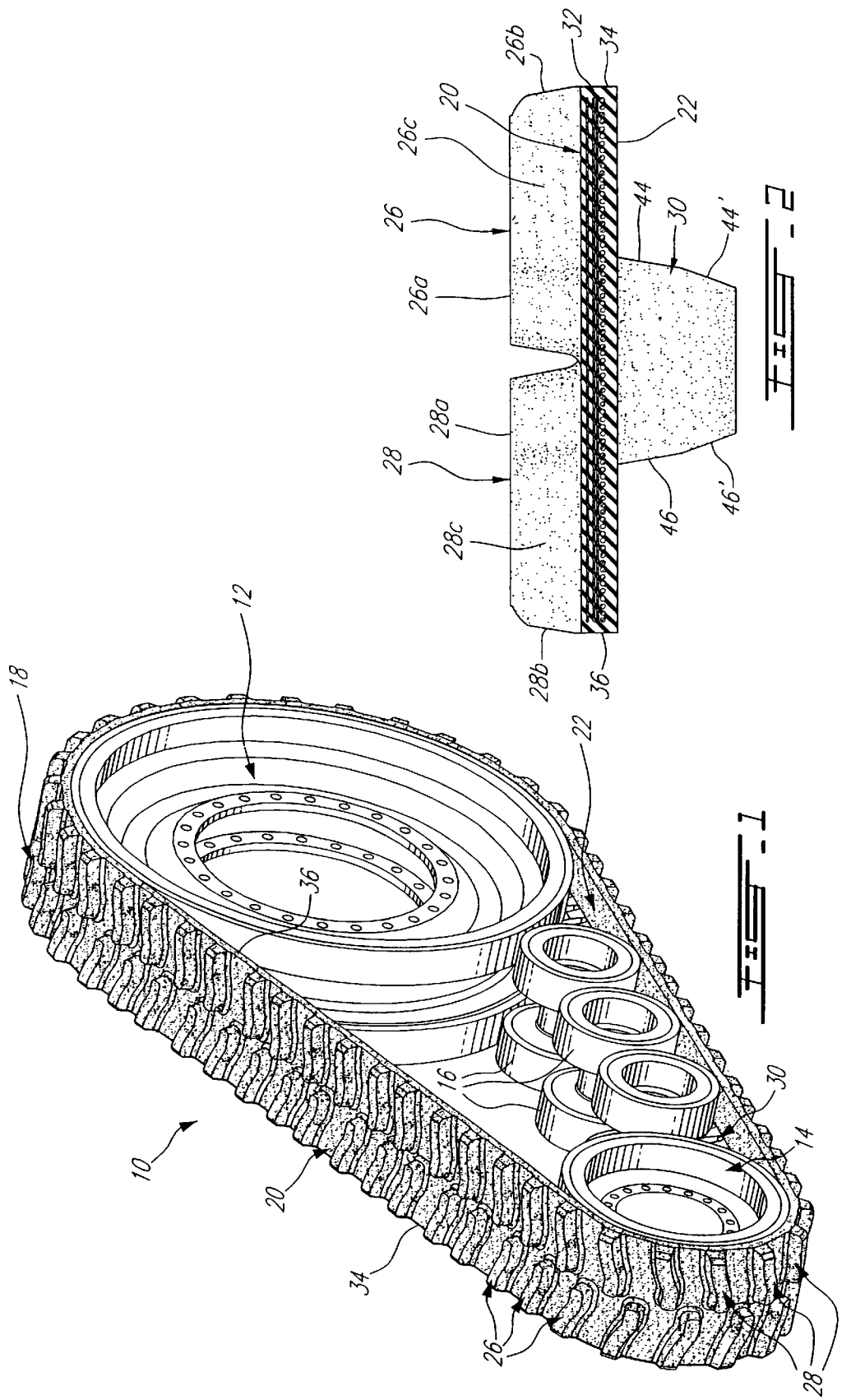

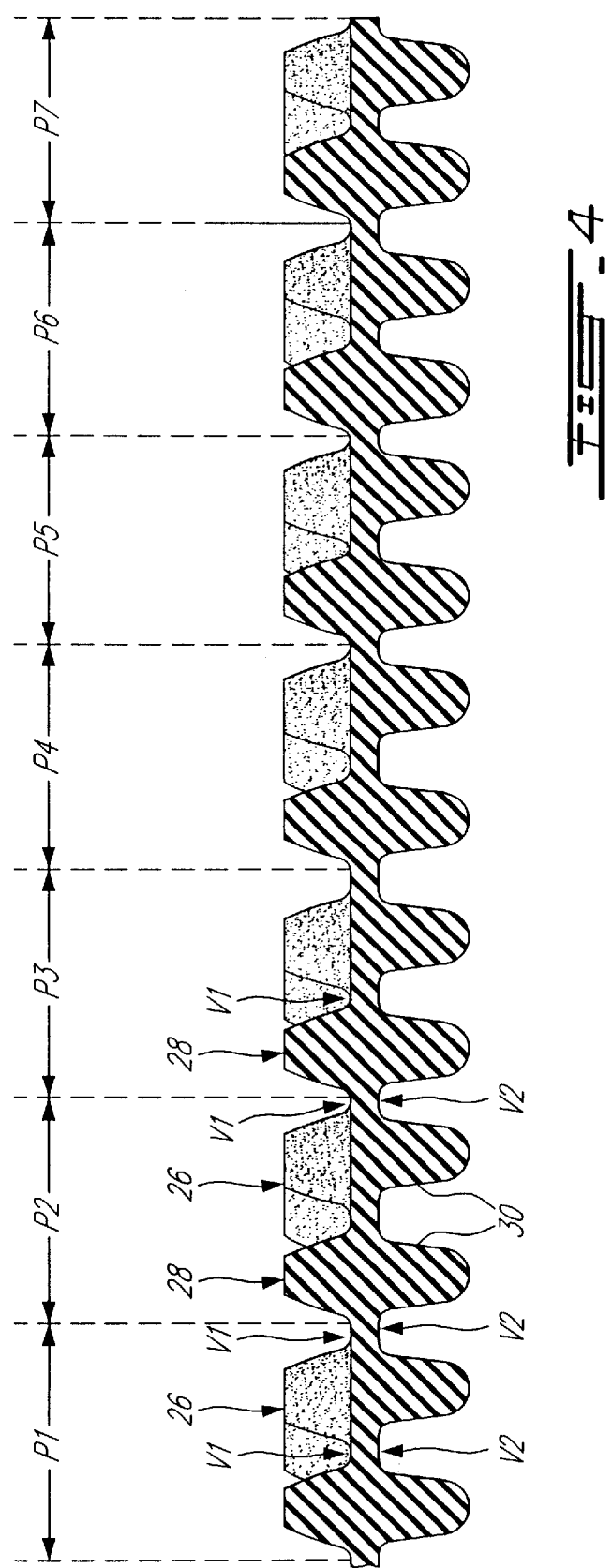

ENDLESS BELT FOR USE WITH HEAVY DUTY TRACK VEHICLES

FIELD OF THE INVENTION

The present invention pertains to an endless belt for use with a heavy duty track vehicle, such as a crawler-type vehicle, a tractor or equipment having tracks over wheels that provide both ground support and tractive effort.

BACKGROUND OF THE INVENTION

The propulsion system found on heavy duty vehicles consists of a pair of longitudinally spaced apart wheel structures which are arranged on opposite sides of the vehicle chassis which is driven by a pair of endless, substantially inextensible belts, each having an inner surface and an outer surface. The inner surface is provided with a series of longitudinally spaced members which guide the track relative to driving and tracking wheels forming part of the wheel structures. The outer surface of the belt is formed of a plurality of longitudinally spaced tread members that provide traction to the vehicle when travelling on various ground conditions.

One such belt structure is illustrated and described in U.S. Pat. No. 5,279, 378 issued Jan. 18, 1994 to Caterpillar Inc. Similar tracks are also illustrated and described in U.S. Pat. No. 5,005,922 issued Apr. 9, 1991 to Edwards & Co. and U.S. Pat. No. 5,984,438 issued Nov. 16, 1999 to Tsunoda et al.

These endless belts, although inextensible, are subject to bending as they engage the necessary supporting wheels such as drive and idler wheels or rollers. As the belt passes around and contact these wheels, they are subject to stress and it is noted that the greatest stress occurs at the base of the tread member or its junction with the top surface of belt. Belt slitting is also noted whenever the construction of the belt consists of a tread member and a guide member in the same vertical plane.

Vibration is also a problem with these types of belts.

OBJECTS AND STATEMENTS OF THE INVENTION

It is an object of the present invention to provide a geometry to an endless belt of a heavy duty track propelled vehicle which greatly reduces the stress exerted on the belt, especially during its bending occurrence when driven. This is achieved by precisely locating the relative positions of the tread members on the outer surface of the belt to that of the guide members on the inner surface of the track.

It is another object of the present invention to provide an arrangement of tread members that will result in a reduction of vibration.

The present invention therefore relates to an endless belt for use with a heavy duty track vehicle comprising:

an elongated endless body made of polymeric material, said body having a longitudinal direction, an outer surface and an inner surface;

a plurality of longitudinally spaced guide members integrally formed to said inner surface extending transversely to the longitudinal direction at mid-section of said body and defining first valleys between adjacent guide members; and two rows of longitudinally spaced tread members integrally formed to said outer surface; the tread members of a first of said rows being longitudinally offset relative to the tread members of a second of said rows; each said tread member of said first and said second rows having an inner edge area located at a mid-section of said body and extending transversely to a longitudinal direction of the belt; said tread members defining second valleys between adjacent inner edge areas of each said rows and an outer edge area; said tread members defining a series of pitches on said outer surface of said track wherein a pitch is defined as including a tread member of the first row and an adjacent tread member of the second row; each said inner edge area of said tread members being in vertical alignment with a corresponding one of said guide members on said inner surface of said body and parallel to the corresponding one of the guide members;

wherein two longitudinally spaced guide members are provided on the inner surface for each pitch of said outer surface;

wherein each pitch on said belt differs from another pitch in value;

wherein each first valley is in vertical alignment with corresponding second valley so that flexing of said track, when bending, occurs in said first and second valleys where thickness of the body is at its minimum.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

FIG. 1 is a perspective view showing a belt made in accordance with the present invention, mounted on idler and drive wheels;

FIG. 2 is a cross-sectional view of the belt;

FIG. 4 is a cross-sectional view taken along lines 4—4 of FIG. 3.

DESCRIPTION OF PREFERRED EMBODIMENTS

Figure 3:
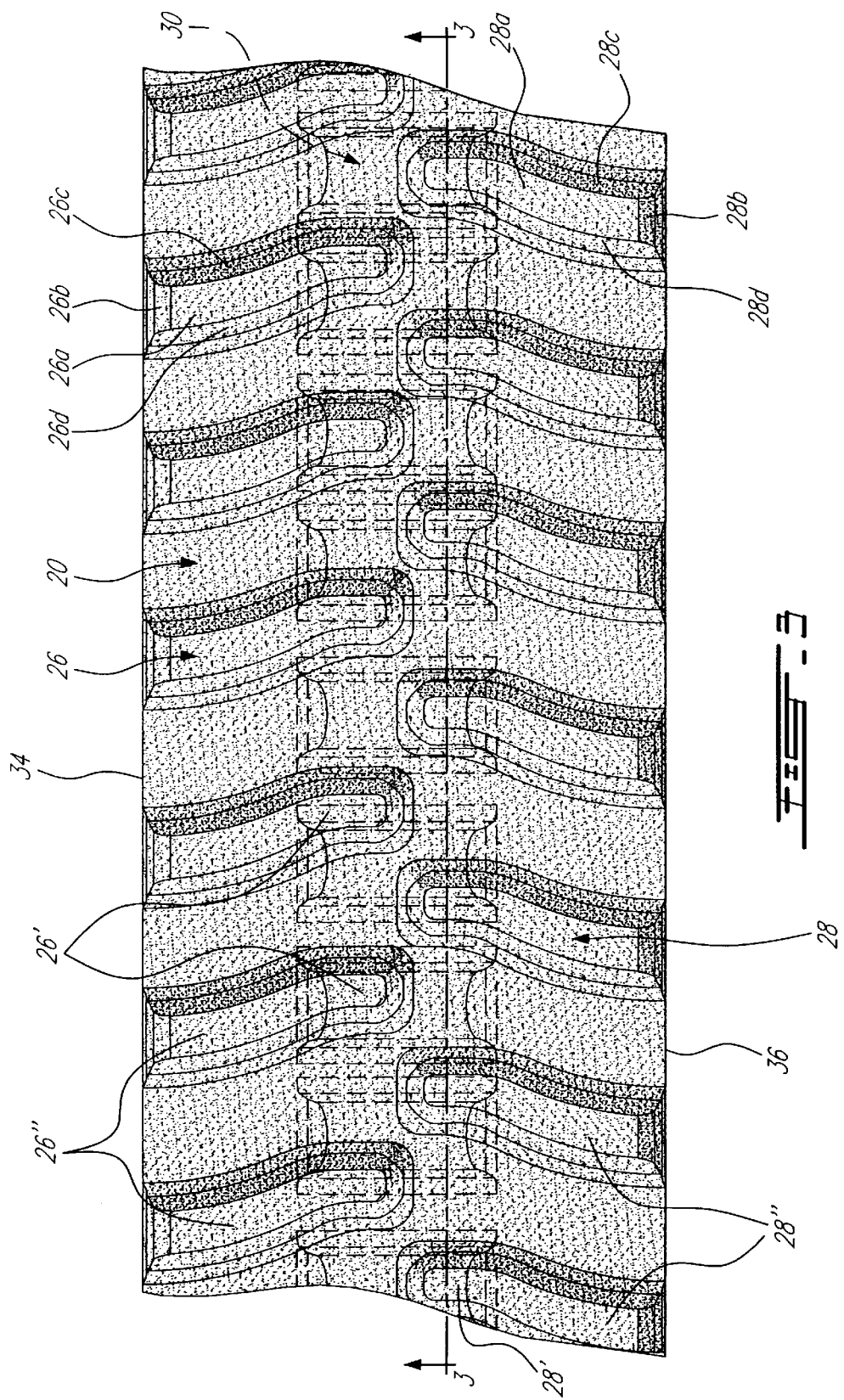
FIG. 3 is a top plan view showing part of the belt.

Referring to FIG. 1, there is shown a wheel structure, generally denoted 10, which may be found on each opposite side of the chassis of a heavy duty track propelled vehicle (not shown). The structure usually includes a rear drive wheel 12, a front idler wheel 14 and a series of track contacting rollers 16, all wheels being included within the loop defined by an endless track or belt 18. Traction to the belt is achieved by a high frictional engagement of the belt with the wheels 12 and 14. The endless belt made in accordance with the present invention comprises an endless elongated body made of polymeric material having an outer surface 20 and an inner surface 22.

The outer surface 20 comprises two rows of longitudinally spaced tread members 26 and 28 that provide traction to the vehicle while the inner face comprises a series of longitudinally spaced guide members 30 which are adapted to provide guiding of the track relative to the wheels of the drive structure. The core of the belt may be reinforced with steel cables and wires 32 as is conventionally known.

Referring to FIG. 2, each tread member 26, 28 has a generally trapezoidal shape; it is defined by a sloping end wall 26a, 28a, adjacent to the outer edges 34 and 36 of the belt, a flat top wall 26b and 28b and opposite generally parallel side faces 26c and 26d, 28c and 28d. The tread members define an inner edge area 26', 28' and an outer edge area 26", 28" that extends obliquely relative to the longitudinal plane of the track.

Referring again to FIG. 2, the guide member 30 is centrally located at mid-section on the inner surface of the belt and is defined by opposite front and rear faces 40 and 42, opposite side faces 44 and 46 and a rounded lower face 48. Each side face has an inwardly sloping lower section 44' and 46'.

As can be seen in FIG. 3, the central area of the belt includes, on the outer surface thereof, the inner edge areas 26' and 28' of each tread members, on the inner surface thereof, each guide member 30. An important feature of the present invention is that these areas 26' and 28' extend in a same vertical plane as that of a corresponding guide member 30 located on the inner surface.

Referring to FIG. 4, it can be seen that two successive areas 26 and 28 of the tread members define successive first valleys $V_1$ while two successive guide members 30 define successive second valleys $V_2$. Those valleys $V_1$ and $V_2$ are always in vertical alignment with one another so that, when the belt is subjected to bending, the flexing always occurs where the belt is at its minimum thickness, and this for the entire width of the track.

Referring to FIG. 4, a pitch "p" of the track is defined on the outer surface of the belt as including one tread member 26 and one tread member 28; there is thus provided, in each pitch, two guide members 30.

In order to reduce vibration during rotation of the belt, the present invention is concerned in giving to each pitch a different value so that p1, p2, p3, p4, p5, etc each have different distances. It is recognized that difference between the pitch values may be very small; for example, for a track of 823 cm having 36 treads, a constant pitch is 22.86 cm. Hence, if a variation of 7 cm is considered, acceptable pitches would be 22.86 ∀ 7 cm. It is noted that such calculation may be achieve by software products, one of which used by applicant is the one known under the trade mark MATLAB utilizing the TRACK program.

Although the invention has been described above with respect with one specific form, it will be evident to a person skilled in the art that it may be modified and refined in various ways. For example, although it is said that all pitches vary, it may be envisaged that there may be a few number of pitches may have the same value as long as the great majority of pitches are of different value. It is therefore wished to have it understood that the present invention should not be limited in scope, except by the terms of the following claims.

What is claimed is:

1. An endless belt for use with a heavy duty track vehicle comprising:

an elongated endless body made of polymeric material, said body having a longitudinal direction, an outer surface and an inner surface;

a plurality of longitudinally spaced guide members integrally formed to said inner surface extending transversely to the longitudinal direction at mid-section of said body and defining first valleys between adjacent guide members; and two rows of longitudinally spaced tread members integrally formed to said outer surface; the tread members of a first of said rows being longitudinally offset relative to the tread members of a second of said rows; each said tread member of said first and said second rows having an inner edge area located at a mid-section of said body and extending transversely to a longitudinal direction of the belt; said tread members defining second valleys between adjacent inner edge areas of each said rows and an outer edge area; said tread members defining a series of pitches on said outer surface of said track wherein a pitch is defined as including a tread member of the first row and an adjacent tread member of the second row; each said inner edge area of said tread members being in vertical alignment with a corresponding one of said guide members on said inner surface of said body and parallel to the corresponding one of the guide members;

wherein two longitudinally spaced guide members are provided on the inner surface for each pitch of said outer surface;

wherein each pitch on said belt differs from another pitch in value;

wherein each first valley is in vertical alignment with corresponding second valley so that flexing of said track, when bending, occurs in said first and second valleys where thickness of the body is at its minimum.

2. An endless belt as defined in claim 1, wherein said transversely extending inner edge area is defined by opposite parallel side faces and a rounded inner end face; said side faces extending in a plane perpendicular to the longitudinal plane of said endless body.

3. An endless belt as defined in claim 2, wherein said outer edge area of each said tread member extends obliquely from transversely extending said inner edge area thereof to the outer edge of said body.

\* \* \* \* \*